United States Patent
Schmidl et al.

(10) Patent No.: US 6,424,642 B1
(45) Date of Patent: Jul. 23, 2002

(54) ESTIMATION OF DOPPLER FREQUENCY THROUGH AUTOCORRELATION OF PILOT SYMBOLS

(75) Inventors: Timothy M. Schmidl, Dallas; Anand G. Dabak, Richardson, both of TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 09/224,632

(22) Filed: Dec. 31, 1998

(51) Int. Cl.[7] .............................................. H04B 7/216
(52) U.S. Cl. ......................... 370/342; 370/335; 370/491
(58) Field of Search ................................. 370/320, 335, 370/342, 491, 500, 516, 517

(56) References Cited

U.S. PATENT DOCUMENTS 5,799,035 A * 8/1998 Lattard et al. ............... 375/152
5,982,763 A * 11/1999 Sato ............................ 370/335
6,166,622 A * 12/2000 Hosur et al. ................. 340/316
6,304,624 B1 * 10/2001 Seki et al. ................... 375/130
6,310,856 B1 * 10/2001 Taipale ........................ 370/208
6,330,272 B1 * 12/2001 Lomp ......................... 375/147

* cited by examiner

Primary Examiner—Hassan Kizou
Assistant Examiner—Tim Spafford
(74) Attorney, Agent, or Firm—Robert N. Rountree; Wade James Brady, III; Frederick J. Telecky, Jr.

(57) ABSTRACT

A circuit coupled to receive a sequence of signals is designed with a multiplication circuit (416, 420) coupled to receive a first signal, a second signal and a complex conjugate of the first signal. The second signal follows the first signal in time. The multiplication circuit produces a first product sequence of the first signal and the complex conjugate and a second product sequence of the second signal and the complex conjugate. A summation circuit (424, 426) is coupled to receive the first product sequence and the second product sequence. The summation circuit produces a first sum of the first product sequence and a second sum of the second product sequence.

25 Claims, 3 Drawing Sheets

ESTIMATION OF DOPPLER FREQUENCY THROUGH AUTOCORRELATION OF PILOT SYMBOLS

FIELD OF THE INVENTION

This invention relates to wideband code division multiple access (WCDMA) for a communication system and more particularly to Doppler frequency estimation of WCDMA signals with space-time transmit diversity.

BACKGROUND OF THE INVENTION

Present code division multiple access (CDMA) systems are characterized by simultaneous transmission of different data signals over a common channel by assigning each signal a unique code. This unique code is matched with a code of a selected receiver to determine the proper recipient of a data signal. These different data signals arrive at the receiver via multiple paths due to ground clutter and unpredictable signal reflection. Additive effects of these multiple data signals at the receiver may result in significant fading or variation in received signal strength. In general, this fading due to multiple data paths may be diminished by spreading the transmitted energy over a wide bandwidth. This wide bandwidth results in greatly reduced fading compared to narrow band transmission modes such as frequency division multiple access (FDMA) or time division multiple access (TDMA).

New standards are continually emerging for next generation wideband code division multiple access (WCDMA) communication systems as described in Provisional U.S. Patent Application No. 60/082,671, filed Apr. 22, 1998, and incorporated herein by reference. These WCDMA systems are coherent communications systems with pilot symbol assisted channel estimation schemes. These pilot symbols are transmitted as quadrature phase shift keyed (QPSK) known data in predetermined time frames to any receivers within range. The frames may propagate in a discontinuous transmission (DTX) mode. For voice traffic, transmission of user data occurs when the user speaks, but no data symbol transmission occurs when the user is silent. Similarly for packet data, the user data may be transmitted only when packets are ready to be sent. The frames are subdivided into sixteen equal time slots of 0.625 milliseconds each. Each time slot is further subdivided into equal symbol times. At a data rate of 32 KSPS, for example, each time slot includes twenty symbol times. Each frame includes pilot symbols as well as other control symbols such as transmit power control (TPC) symbols and rate information (RI) symbols. These control symbols include multiple bits otherwise known as chips to distinguish them from data bits. The chip transmission time ($T_c$), therefore, is equal to the symbol time rate (T) divided by the number of chips in the symbol (N).

Previous studies have shown that multiple transmit antennas may improve reception by increasing transmit diversity for narrow band communication systems. In their paper *New Detection Schemes for Transmit Diversity with no Channel Estimation,* Tarokh et al. describe such a transmit diversity scheme for a TDMA system. The same concept is described in *A Simple Transmitter Diversity Technique for Wireless Communications* by Alamouti. Tarokh et al. and Alamouti, however, fail to teach such a transmit diversity scheme for a WCDMA communication system.

Other studies have investigated open loop transmit diversity schemes such as orthogonal transmit diversity (OTD) and time switched time diversity (TSTD) for WCDMA systems. Both OTD and TSTD systems have similar performance. Both use multiple transmit antennas to provide some diversity against fading, particularly at low Doppler rates and when there are insufficient paths for the rake receiver. Both OTD and TSTD systems, however, fail to exploit the extra path diversity that is possible for open loop systems. For example, the OTD encoder circuit of FIG. 5 receives symbols $S_1$, and $S_2$ on lead 500 and produces output signals on leads 504 and 506 for transmission by first and second antennas, respectively. These transmitted signals are received by a despreader input circuit (not shown). The despreader circuit sums received chip signals over a respective symbol time to produce first and second output signals $R_j^1$ and $R_j^2$ on leads 620 and 622 as in equations [1–2], respectively.

$$R_j^1 = \sum_{i=0}^{N-1} r_j(i+\tau_j) = \alpha_j^1 S_1 + \alpha_j^2 S_2 \qquad [1]$$

$$R_j^2 = \sum_{i=N}^{2N-1} r_j(i+\tau_j) = \alpha_j^1 S_1 - \alpha_j^2 S_2 \qquad [2]$$

The OTD phase correction circuit of FIG. 6 receives the output signals $R_j^1$ and $R_j^2$ corresponding to the $j^{th}$ of L multiple signal paths. The phase correction circuit produces soft outputs or signal estimates $\tilde{S}1$ and $\tilde{S}2$ for symbols $S_1$ and $S_2$ at leads 616 and 618 as shown in equations [3–4], respectively.

$$\tilde{S}_1 = \sum_{j=1}^{L} (R_j^1 + R_j^2)\alpha_j^{1*} = \sum_{j=1}^{L} 2|\alpha_j^1|^2 S_1 \qquad [3]$$

$$\tilde{S}_2 = \sum_{j=1}^{L} (R_j^1 - R_j^2)\alpha_j^{2*} = \sum_{j=1}^{L} 2|\alpha_j^2|^2 S_2 \qquad [4]$$

Equations [3–4] show that the OTD method provides a single channel estimate $\alpha$ for each path j. A similar analysis for the TSTD system yields the same result. The OTD and TSTD methods, therefore, are limited to a path diversity of L. This path diversity limitation fails to exploit the extra path diversity that is possible for open loop systems as will be explained in detail.

Hosur et al. previously taught a new method for frame synchronization with space time transmit diversity (STTD) having a path diversity of 2L in U.S. Pat. application Ser. No. 09/195,942, filed Nov. 19, 1998, and incorporated herein by reference. Therein, Hosur et al. taught advantages of this increased diversity for WCDMA systems. Hosur et al. did not teach or suggest how this improved diversity might relate to Doppler frequency estimation.

Doppler frequency estimation is particularly critical in WCDMA systems where a mobile receiver may move with respect to a base station by car or high-speed train. Such motion may produce an apparent change of frequency or Doppler frequency shift of over 500 Hz. A reliable Doppler frequency estimate is important for Rayleigh fading parameter channel estimates, transmit power control (TPC) estimates and efficient use of downlink transmit antenna diversity such as STTD. Knowledge of the Doppler frequency is equally important for other channel estimate schemes such as iterative channel estimation (ICE) or weighted multi-slot averaging (WMSA). For example, knowledge of a Doppler frequency shift permits use of an optimal Weiner filter for channel estimates. If the Doppler frequency shift is unknown, the same filter must be used for a wide range of Doppler frequencies resulting in a degraded link margin.

Use of an optimal filter is also highly advantageous in TPC estimation. Furthermore, downlink transmit antenna diversity operates differently with varying Doppler frequencies. At low Doppler frequencies, for example, a mobile system may send information to the base station indicating which antenna signal is stronger. At high Doppler frequencies, space-time code across transmit antennas may be used to achieve transmit diversity.

SUMMARY OF THE INVENTION

The foregoing problems are resolved by a circuit coupled to receive a sequence of signals comprising a multiplication circuit coupled to receive a first signal, a second signal and a complex conjugate of the first signal. The second signal follows the first signal in time. The multiplication circuit produces a first product sequence of the first signal and the complex conjugate and a second product sequence of the second signal and the complex conjugate. A summation circuit is coupled to receive the first product sequence and the second product sequence. The summation circuit produces a first sum of the first product sequence and a second sum of the second product sequence.

The present invention provides highly accurate estimates of Doppler frequency shift. The estimates are compatible with STTD and other diversity schemes.

BRIEF DESCRIPTION OF THE DRAWINGS

A more complete understanding of the invention may be gained by reading the subsequent detailed description with reference to the drawings wherein.

DETAILED DESCRIPTION OF THE PREFERRED EMBODIMENTS

Figure 1:
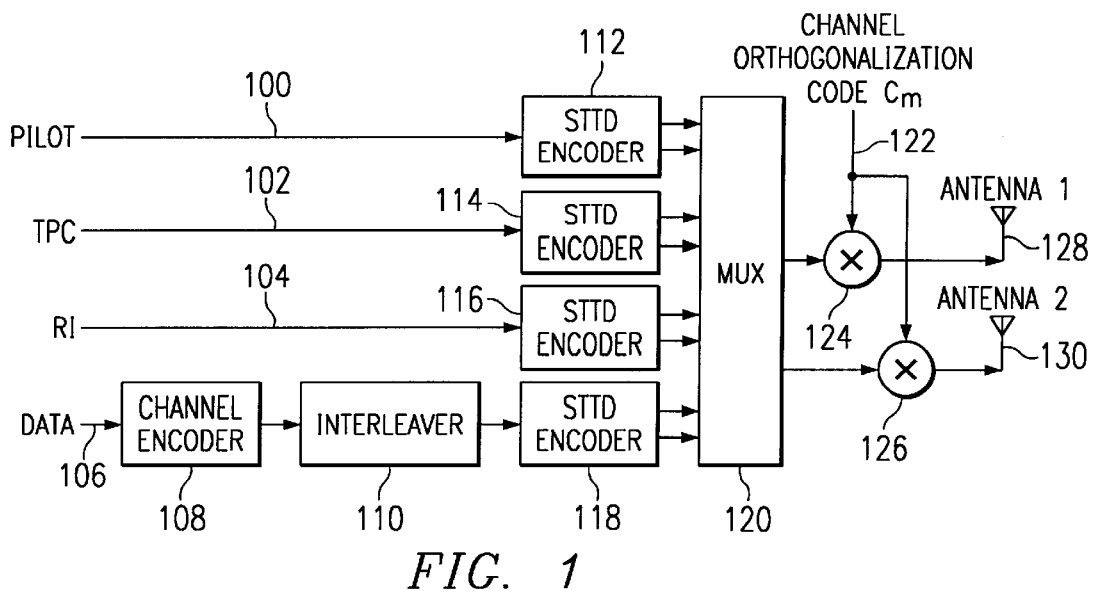
FIG. 1 is a simplified block diagram of a typical transmitter using Space Time Transit Diversity (STTD) of the present invention.

Referring to FIG. 1, there is a simplified block diagram of a typical transmitter using Space Time Transit Diversity (STTD) of the present invention. The transmitter circuit receives pilot symbols, TPC symbols, RI symbols and data symbols on leads 100, 102, 104 and 106, respectively. Each of the symbols is encoded by a respective STTD encoder as will be explained in detail. Each STTD encoder produces two output signals that are applied to multiplex circuit 120. The multiplex circuit 120 produces each encoded symbol in a respective symbol time of a frame. Thus, a serial sequence of symbols in each frame is simultaneously applied to each respective multiplier circuit 124 and 126. A channel orthogonal code $C_m$ is multiplied by each symbol to provide a unique signal for a designated receiver. The STTD encoded frames are then applied to antennas 128 and 130 for transmission.

Figure 2:
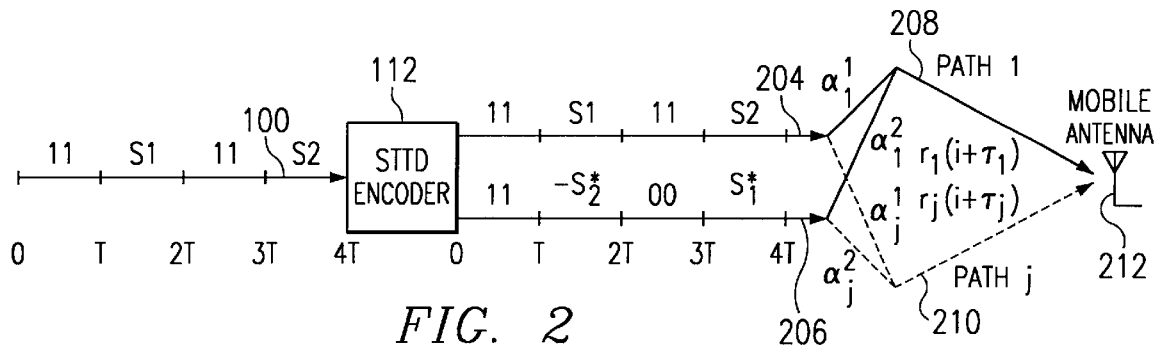
FIG. 2 is a block diagram showing signal flow in an STTD encoder of the present invention that may be used with the transmitter of FIG. 1.

Turning now to FIG. 2, there is a block diagram showing signal flow in an STTD encoder of the present invention that may be used with the transmitter of FIG. 1 for pilot symbol encoding. The pilot symbols are predetermined control signals that may be used for channel estimation and other functions as will be described in detail. Operation of the STTD encoder 112 will be explained with reference to TABLE 1. The STTD encoder receives pilot symbol 11 at symbol time T, pilot symbol $S_1$ at symbol time 2T, pilot symbol 11 at symbol time 3T and pilot symbol $S_2$ at symbol time 4T on lead 100 for each of sixteen time slots of a frame. For a first embodiment of the present invention having a data rate of preferably 32 KSPS, the STTD encoder produces a sequence of four pilot symbols for each of two antennas corresponding to leads 204 and 206, respectively, for each of the sixteen time slots of TABLE 1. The STTD encoder produces pilot symbols $B_1$, $S_1$, $B_2$ and $S_2$ at symbol times T–4T, respectively, for a first antenna at lead 204. The STTD encoder simultaneously produces pilot symbols $B_1$, $-S^*_2$, $-B_2$ and $S^*_1$ at symbol times T–4T, respectively, at lead 206 for a second antenna. Each symbol includes two bits representing a real and imaginary component. An asterisk indicates a complex conjugate operation or sign change of the imaginary part of the symbol. Pilot symbol values for the first time slot for the first antenna at lead 204, therefore, are 11, 11, 11 and 11. Corresponding pilot symbols for the second antenna at lead 206 are 11, 01, 00, and 10.

The bit signals $r_j(i+\tau_j)$ of these symbols are transmitted serially along respective paths 208 and 210. Each bit signal of a respective symbol is subsequently received at a remote mobile antenna 212 after a transmit time τ corresponding to the $j^{th}$ path. The signals propagate to a despreader input circuit (not shown) where they are summed over each respective symbol time to produce input signals $R_j^1, R_j^2, R_j^3$ and $R_j^4$ corresponding to the four pilot symbol time slots and the $j^{th}$ of L multiple signal paths as previously described.

TABLE 1

| SLOT | ANTENNA 1 | | | | ANTENNA 2 | | | |
|---|---|---|---|---|---|---|---|---|
| | $B_1$ | $S_1$ | $B_2$ | $S_2$ | $B_1$ | $-S^*_2$ | $-B_2$ | $S^*_1$ |
| 1 | 11 | 11 | 11 | 11 | 11 | 01 | 00 | 10 |
| 2 | 11 | 11 | 11 | 01 | 11 | 11 | 00 | 10 |
| 3 | 11 | 01 | 11 | 01 | 11 | 11 | 00 | 00 |
| 4 | 11 | 10 | 11 | 01 | 11 | 11 | 00 | 11 |
| 5 | 11 | 10 | 11 | 11 | 11 | 01 | 00 | 11 |
| 6 | 11 | 10 | 11 | 11 | 11 | 01 | 00 | 11 |
| 7 | 11 | 01 | 11 | 00 | 11 | 10 | 00 | 00 |
| 8 | 11 | 10 | 11 | 01 | 11 | 11 | 00 | 11 |
| 9 | 11 | 11 | 11 | 00 | 11 | 10 | 00 | 10 |
| 10 | 11 | 01 | 11 | 01 | 11 | 11 | 00 | 00 |
| 11 | 11 | 11 | 11 | 10 | 11 | 00 | 00 | 10 |
| 12 | 11 | 01 | 11 | 01 | 11 | 11 | 00 | 00 |
| 13 | 11 | 00 | 11 | 01 | 11 | 11 | 00 | 01 |
| 14 | 11 | 10 | 11 | 00 | 11 | 10 | 00 | 11 |
| 15 | 11 | 01 | 11 | 00 | 11 | 10 | 00 | 00 |
| 16 | 11 | 00 | 11 | 00 | 11 | 10 | 00 | 01 |

The input signals corresponding to the pilot symbols for each time slot are given in equations [5–8]. Noise terms are omitted for simplicity. Received signal $R_j^1$ is produced by pilot symbols ($B_1,B_1$) constant value (11,11) at symbol time T for all time slots. Thus, the the sum of respective Rayleigh fading parameters corresponding to the first and second antennas. Likewise, received signal $R_j^3$ is produced by pilot symbols ($B_2,-B_2$) having a constant value (11,00) at symbol time 3T for all time slots. Channel estimates for the Rayleigh fading parameters corresponding to the first and second antennas, therefore, are readily obtained from input signals $R_j^1$ and $R_j^3$ as in equations [9] and [10].

$$R_j^1 = \alpha_j^1 + \alpha_j^2 \quad [5]$$

$$R_j^2 = \alpha_j^1 S_1 - \alpha_j^2 S^*_2 \quad [6]$$

$$R_j^3 = \alpha_j^1 - \alpha_j^2 \quad [7]$$

$$R_j^4 = \alpha_j^1 S_2 + \alpha_j^2 S^*_1 \quad [8]$$

$$\alpha_j^1 = (R_j^1 + R_j^3)/2 \quad [9]$$

$$\alpha_j^2 = (R_j^1 - R_j^3)/2 \quad [10]$$

Figure 3:
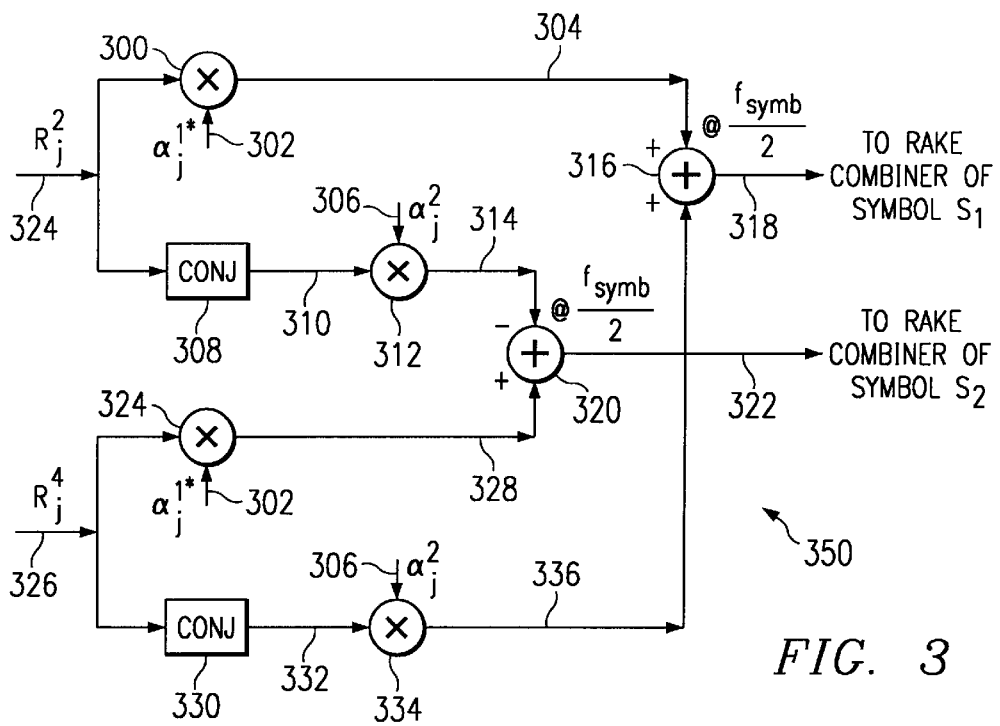
FIG. 3 is a schematic diagram of a phase correction circuit of the present invention that may be used with a receiver.

Referring now to FIG. 3, there is a schematic diagram of a phase correction circuit of the present invention that may be used with a remote mobile receiver. This phase correction circuit receives input signals $R_j^2$ and $R_j^4$ on leads 324 and 326 at symbol times 2T and 4T, respectively. Each input signal has a value determined by the transmitted pilot symbols as shown in equations [6] and [8], respectively. The phase correction circuit receives a complex conjugate of a channel estimate of a Rayleigh fading parameter $\alpha_j^{1*}$ corresponding to the first antenna on lead 302 and a channel estimate of another Rayleigh fading parameter $\alpha_j^2$ corresponding to the second antenna on lead 306. Complex conjugates of the input signals are produced by circuits 308 and 330 at leads 310 and 322, respectively. These input signals and their complex conjugates are multiplied by Rayleigh fading parameter estimate signals and summed as indicated to produce path-specific first and second symbol estimates at respective output leads 318 and 322 as in equations [11] and [12].

$$R_j^2 \alpha_j^{1*} + R_j^{4*} \alpha_j^2 = (|\alpha_j^1|^2 + |\alpha_j^2|^2) S_1 \quad [11]$$

$$-R_j^{2*} \alpha_j^2 + R_j^4 \alpha_j^{1*} = (|\alpha_j^1|^2 + |\alpha_j^2|^2) S_2 \quad [12]$$

These path-specific symbol estimates are then applied to a rake combiner circuit (not shown) to sum individual path-specific symbol estimates, thereby providing net soft symbols or pilot symbol signals as in equations [13] and [14].

$$\tilde{S}_1 = \sum_{j=1}^{L} R_j^2 \alpha_j^{1*} + R_j^{4*} \alpha_j^2 \quad [13]$$

$$\tilde{S}_2 = \sum_{j=1}^{L} -R_j^{2*} \alpha_j^2 + R_j^4 \alpha_j^{1*} \quad [14]$$

These soft symbols or estimates provide a path diversity L and a transmit diversity 2. Thus, the total diversity of the STTD system is 2L. This increased diversity is highly advantageous in providing a reduced bit error rate.

Figure 4:
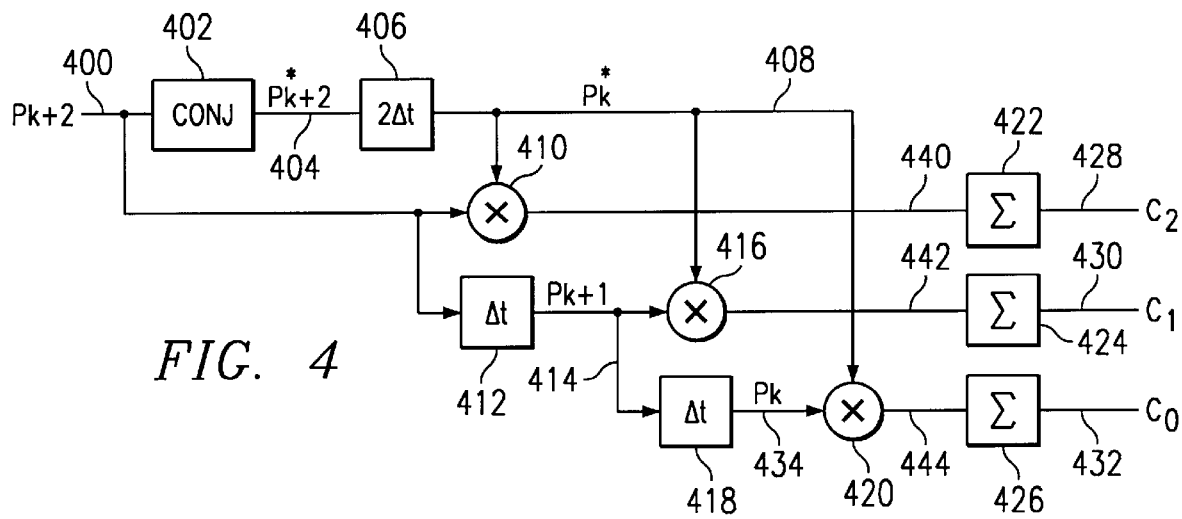
FIG. 4 is a schematic diagram of a circuit for calculating autocorrelation values.
Figure 5:
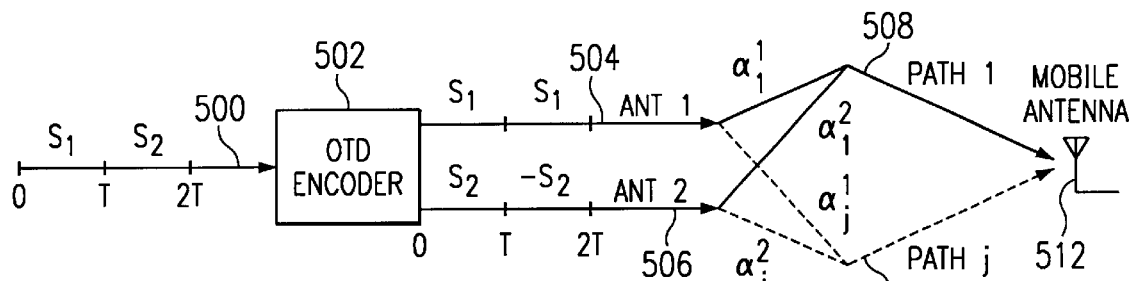
FIG. 5 is a block diagram showing signal flow in an OTD encoder of the prior art.
Figure 6:
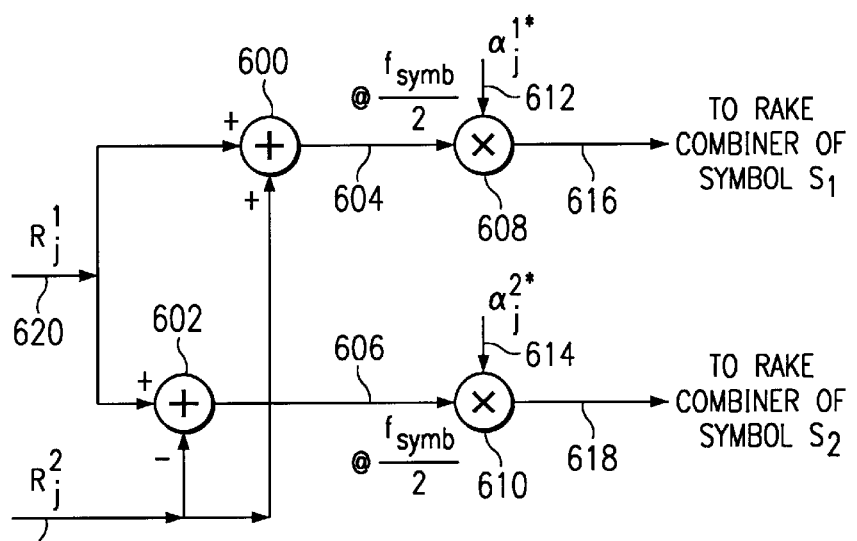
FIG. 6 is a schematic diagram of a phase correction circuit of the prior art.

Referring now to FIG. 4, there is a schematic diagram of a circuit for calculating autocorrelation values with STTD. The soft symbols or pilot symbol signals from the rake combiner as in equations [13–14] are summed for each respective time slot. A sequence of these summed pilot symbol signals corresponding to each respective time slot is applied to lead 400. An exemplary summed pilot symbol signal, for example $p_{k+2}$ corresponding to a sum of pilot symbol signals of time slot k+2, is applied to conjugate circuit 402. Conjugate circuit 402 inverts the imaginary component of the summed pilot symbol signal to produce conjugate signal $p^*_{k+2}$ on lead 404. Delay circuit 406 produces delayed pilot symbol signal $p^*_k$ from the $k^{th}$ time slot on lead 408. Multiplier circuit 410 applies a product $p^*_k p_{k+2}$ on lead 440 to summation circuit 422. Summation circuit 422 accumulates each product of the sequence for each time slot for preferably one second and produces autocorrelation value $C_2$ as in equation [17]. Delay circuit 412 produces delayed summed pilot symbol signal $p_{k+1}$ from time slot k+1 on lead 414. Multiplier circuit 416 produces a product $p^*_k p_{k+1}$ on lead 442. Summation circuit 424 accumulates each product on lead 442 for preferably one second and produces autocorrelation value $C_1$ as in equation [16]. Delay circuit 418 produces delayed summed pilot symbol signal $p_k$ on lead 434. Multiplier circuit 420 produces a product $p^*_k p_k$ on lead 444, and summation circuit 426 accumulates each product for preferably one second and produces autocorrelation value $C_0$ as in equation [15].

$$C_0 = \sum_{k=1}^{1600} p^*_k p_k \quad [15]$$

$$C_1 = \sum_{k=1}^{1600} p^*_k p_{k+1} \quad [16]$$

$$C_2 = \sum_{k=1}^{1600} p^*_k p_{k+2} \quad [17]$$

Autocorrelation values $C_1$ and $C_2$ are divided by $C_0$ for normalization. Noise and interference create an impulse for zero delay of autocorrelation value $C_0$. This impulse effectively multiplies $C_0$ by $$\frac{S+I}{S},$$

where S is signal power and I is noise plus interference power. Thus, normalized autocorrelation values have a form of equations [18–19].

$$\hat{C}_1 = \frac{(S+I) \cdot C_1}{S \cdot C_0} \quad [18]$$

$$\hat{C}_2 = \frac{(S+I) \cdot C_2}{S \cdot C_0} \quad [19]$$

Figure 7:
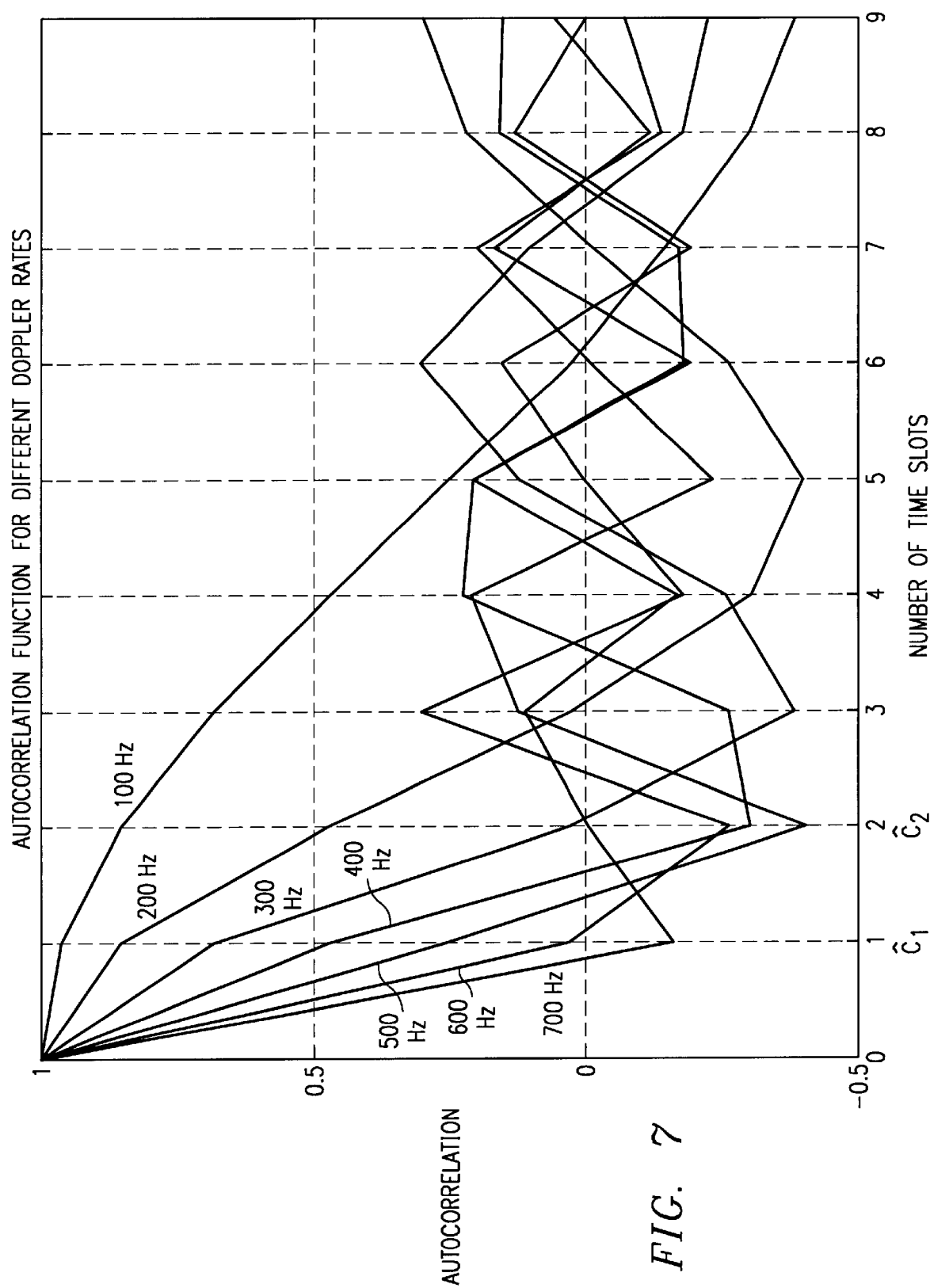
FIG. 7 is a plot of autocorrelation values for various Doppler frequencies over multiple time slots.

Application of these normalized autocorrelation values to estimate Doppler frequencies will now be explained in detail with reference to FIG. 7. The family of normalized autocorrelation curves of FIG. 7 are discrete points of Bessel functions corresponding to respective time slots. The curves correspond to respective Doppler frequencies of 100 Hz through 700 Hz in 100 Hz increments. Normalized autocorrelation values $\hat{C}_1$ and $\hat{C}_2$ lie along the vertical axes corresponding to time slots one and two. Known values of Bessel functions are used to estimate Doppler frequencies from the normalized autocorrelation values of equations. For example, if normalized autocorrelation value $\hat{C}_1$ is greater than or equal to 0.5, then the Doppler frequency is close to the 100 Hz to 400 Hz curves. Alternatively, if normalized autocorrelation value $\hat{C}_1$ is less than 0.5, then the Doppler frequency is close to the 400 Hz to 700 Hz curves. An optimal estimate of the Doppler frequency, therefore, is one that minimizes the mean squared error between the known Bessel function values and the normalized autocorrelation values as in equation [20]. These Bessel function values correspond to frequencies $f_{k1}$ and $f_{k2}$ for time slots 1 and 2, respectively.

$$\text{Doppler frequency index} = \arg\min(|f_{k1} - \hat{C}_1|^2 + |f_{k2} - \hat{C}_2|^2) \quad [20]$$

Doppler frequency estimation simulations were conducted to determine the accuracy of estimates for Doppler frequencies of 200 Hz, 400 Hz and 600 Hz. All estimates were correct for ten thousand trials at each frequency with a received bit energy-to-noise ratio ($E_0/N_0$) of −3 dB. At a received bit energy to noise ratio ($E_0/N_0$) of −10 dB, there were no errors at 200 Hz, one error at 400 Hz and one hundred twenty-six errors at 600 Hz. The one error at 400 Hz was a 300 Hz estimate. The 600 Hz errors included one hundred twenty-four 500 Hz estimates and two 700 Hz estimates. Thus, Doppler frequency estimates of the present invention are very accurate. Moreover, calculation of these estimates is relatively straightforward and typically requires about 0.25 MIPS.

Although the invention has been described in detail with reference to its preferred embodiment, it is to be understood that this description is by way of example only and is not to be construed in a limiting sense. For example, Doppler frequency estimation of the present invention may be extended to include additional autocorrelation values corresponding to other time slots. Additionally, autocorrelation values need not be normalized as in equations [18–19] to realize advantages of the present invention. Bessel function values corresponding to frequencies $f_{k1}$ and $f_{k2}$ may be multiplied by denominator $S \cdot C_0$ with the same result in equation [19]. Moreover, Doppler frequency estimation need not be restricted to pilot symbol signals. Data symbols, TPC symbols and RI symbols in each respective time slot may be corrected by a phase correction circuit and used as virtual pilot symbols to enhance Doppler frequency estimation. Furthermore, advantages of the present invention are also achieved with other transmit diversity schemes such as time domain transmit diversity (FDTD) as disclosed in volume 3 of the *Association of Radio Industries and Businesses* (ARIB) specification (1998). Advantages of the present invention may also be achieved by a digital signal processing circuit as will be appreciated by those of ordinary skill in the art having access to the instant specification.

It is understood that the inventive concept of the present invention may be embodied in a mobile communication system as well as circuits within the mobile communication system. It is to be further understood that numerous changes in the details of the embodiments of the invention will be apparent to persons of ordinary skill in the art having reference to this description. It is contemplated that such changes and additional embodiments are within the spirit and true scope of the invention as claimed below.

What is claimed:

1. A method of processing signals, comprising the steps of:
   receiving a sequence of predetermined signals from an external source;
   producing a first sequence of output signals by multiplying a first plurality of the predetermined signals by respective complex conjugates of the first plurality of signals;
   producing a second sequence of output signals by multiplying a second plurality of the predetermined signals by said respective complex conjugates of the first plurality of signals, the first plurality of signals being shifted in time from the second plurality of signals;
   producing a first value of samples of the first sequence of output signals;
   producing a second value of samples of the second sequence of output signals; and
   estimating a Doppler frequency in response to the first and second value.

2. A method of processing signals as in claim 1, further comprising the step of determining the Doppler frequency in response to a ratio of the first and second values compared to a known function.

3. A method of processing signals as in claim 2, wherein the known value is a Bessel function.

4. A method of processing signals as in claim 1, further comprising the steps of:
   producing a third sequence of output signals by multiplying a third plurality of the predetermined signals by said respective complex conjugates of the first plurality of signals, the second plurality of signals being shifted in time from the third plurality of signals;
   producing a third value of samples of the third sequence of output signals; and
   estimating a Doppler frequency in response to the first, second and third values.

5. A method of processing signals as in claim 1, wherein each predetermined signal comprises a respective plurality of pilot symbols.

6. A method of processing signals as in claim 5, wherein each said respective plurality of pilot symbols corresponds to a respective time slot, and wherein the first plurality of signals is shifted in time from the second plurality of signals by a time slot.

7. A circuit, comprising:
   a multiplication circuit coupled to receive a first signal sequence, a second signal sequence and a complex conjugate sequence of the first signal sequence, the multiplication circuit producing a first product sequence of the first signal sequence and the complex conjugate sequence and producing a second product sequence of the second signal sequence and the complex conjugate sequence; and
   a summation circuit coupled to receive the first product sequence and the second product sequence, the summation circuit producing a first sum of the first product sequence and a second sum of the second product sequence.

8. A circuit as in claim 7, wherein the first signal sequence is shifted in time with respect to the second signal sequence.

9. A circuit as in claim 7, wherein multiplication circuit is further coupled to receive a third signal sequence, the multiplication circuit producing a third product sequence of the third signal sequence and the complex conjugate sequence, and wherein the summation circuit is further coupled to receive the third product sequence, the summation circuit producing a third sum of the third product sequence.

10. A circuit as in claim 7, wherein each of the first and second signal sequences is a wideband code division multiple access signal sequence.

11. A circuit as in claim 10, wherein each of the first and second signal sequences is received from a first and a second transmit antenna.

12. A circuit as in claim 11, wherein signals from the first and the second transmit antenna are transmitted with space-time transmit diversity.

13. A circuit as in claim 11, wherein signals from the first and the second transmit antenna are transmitted with time domain transmit diversity.

14. A method of processing signals for a communication system, comprising the steps of:
   receiving a sequence of signals from an external source;
   producing a sequence of products of signals from the sequence of signals, each product comprising a plurality of signals from different time slots;
   producing a sum signal by summing the sequence of products of signals for a predetermined time; and
   comparing the sum signal to a predetermined signal.

15. A method of processing signals for a communication system as in claim 14, wherein the predetermined signal comprises a plurality of predetermined values, and wherein the step of comparing includes the step of determining a minimum difference between the sum signal and at least one of the predetermined values.

16. A method of processing signals for a communication system as in claim 15, wherein the predetermined values correspond to a Bessel function.

17. A method of processing signals for a communication system as in claim 14, wherein the step of producing a sequence of products includes the step of producing plural sequences of products, each product comprising the plurality of signals from different time slots.

18. A method of processing signals for a communication system as in claim 17, wherein the step of producing a sum signal includes the step of producing plural sum signals, each sum signal corresponding to a respective sequence of the plural sequences.

19. A method of processing signals for a communication system as in claim 18, wherein the predetermined signal includes plural predetermined values, and wherein the step of comparing includes the step of determining a minimum difference between each sum signal of the plural sum signals and a respective predetermined value of the plural predetermined values.

20. A method of processing signals for a communication system as in claim 19, wherein the predetermined values are Bessel functions.

21. A method of processing signals for a communication system as in claim 19, wherein each of the predetermined values corresponds to a respective Doppler frequency.

22. A method of processing signals for a communication system as in claim 14, wherein the external source comprises plural transmit antennas.

23. A method of processing signals for a communication system as in claim 22, wherein the external source transmits the sequence of signals with space-time transmit diversity.

24. A method of processing signals for a communication system as in claim 22, wherein the external source transmits the sequence of signals with time domain transmit diversity.

25. A method of processing signals for a communication system as in claim 14, wherein the sequence of signals from the external source comprises pilot symbol signals, and wherein each signal of the sequence of signals comprises plural pilot symbols from a respective time slot.

* * * * *